US005878569A

United States Patent [19]

Satzler

[11] Patent Number: 5,878,569

[45] Date of Patent: Mar. 9, 1999

[54] ENERGY CONVERSION SYSTEM

[75] Inventor: Ronald L. Satzler, Princeville, Ill.

[73] Assignee: Caterpillar Inc., Peoria, Ill.

[21] Appl. No.: 922,626

[22] Filed: Sep. 3, 1997

Related U.S. Application Data

[63] Continuation of Ser. No. 734,757, Oct. 21, 1996, abandoned.

[51] Int. Cl.$^{6}$ .......... F16D 31/02

[52] U.S. Cl. .......... 60/418; 60/419; 60/427; 91/519

[58] Field of Search .......... 60/413, 419, 420, 60/427, 418; 91/511, 519

[56] References Cited

U.S. PATENT DOCUMENTS

| | | | |
|---|---|---|---|
| 3,921,500 | 11/1975 | Silcox | 91/4 |
| 4,016,719 | 4/1977 | Yavnai | 60/416 |
| 4,215,545 | 8/1980 | Morello et al. | 60/413 |
| 4,373,332 | 2/1983 | Holmen | 60/426 |
| 4,387,783 | 6/1983 | Carman | 180/165 |
| 4,481,768 | 11/1984 | Goshorn et al. | 60/327 |
| 4,590,763 | 5/1986 | Augoyard et al. | 60/327 |
| 4,674,280 | 6/1987 | Stuhr | 60/413 |
| 4,731,997 | 3/1988 | Hagin | 60/416 |
| 4,751,818 | 6/1988 | Kubik | 60/418 X |
| 5,060,475 | 10/1991 | Latimer | 60/413 |
| 5,138,838 | 8/1992 | Crosser | 60/427 X |
| 5,251,442 | 10/1993 | Roche | 60/419 X |
| 5,460,239 | 10/1995 | Jensen | 180/302 |

OTHER PUBLICATIONS

SAE Paper No. 941776, "A Review of Free Piston Engine Concepts", Peter A.J. Achten, Milwaukee, Wisconsin, Sep. 12–14, 1994.

*Primary Examiner*—Hoang Nguyen
*Attorney, Agent, or Firm*—J. W. Burrows

[57] ABSTRACT

The energy conversion system of the subject invention converts the energy from a source of pressurized fluid, such as a free-piston engine and a storage accumulator, to a work system at various pressure levels. This is accomplished by providing power modifying units which act to efficiently reduce the pressure level of the fluid from the source of pressurized fluid to the various pressure levels. A control arrangement monitors the operating pressures in the actuators and selects the path of pressurized fluid having the lowest pressure level needed to perform the task. Additionally, exhausted fluid containing energy is utilized by regenerating the fluid back to the inlet of the actuator or by directing it through the appropriate power modifying unit to amplify the pressure therein and supplement or recharge the source of pressurized fluid.

19 Claims, 2 Drawing Sheets

ENERGY CONVERSION SYSTEM

This is a file wrapper continuation of application Ser. No. 08/734,757, filed Oct. 21, 1996, now abandoned.

TECHNICAL FIELD

This invention relates generally to an energy conversion system in which a thermo/hydraulic free-piston engine concept is used to provide pressurized hydraulic fluid to a fluid system and more particularly to a control arrangement that efficiently controls the flow of fluid from the thermo/hydraulic free-piston engine to the fluid system.

BACKGROUND ART

In a thermo/hydraulic free-piston engine, the stroke of the piston is used directly to produce hydraulic energy. For every stroke of the piston, a predetermined volume of fluid is delivered from the free-piston engine. Consequently, the pressurized fluid being delivered to the work system is being delivered in pulses. It is well known to use accumulators to store the pressurized fluid so that a steady pressure level can be delivered to the work system. Since the thermo/hydraulic free-piston engine is not continuously ran, the accumulators must store the pressurized fluid up to a maximum limit and cause the thermo/hydraulic free-piston engine to shut off and once the pressure level in the accumulators has reduced to some minimum level the thermo/hydraulic free-piston engine is restarted. In order to keep the accumulators at their maximum pressure level, extra energy from a power source is needed. Actuators in a work system are normally operated to manipulate a load/weight or inertia load of varying capacities. As is well known, when the load is small, the system does not need high pressure to move the load. It would be beneficial to provide the needed volume of fluid at a lower pressure level to move the load. Likewise, when a load is being lowered or the direction of the load is being changed, the volume of fluid being exhausted from the actuator is pressurized and the energy thereof is wasted by allowing the pressurized volume of fluid to be exhausted to the reservoir. At times and under certain conditions, it would be beneficial to use the volume of pressurized fluid to supplement the flow into the actuator or to amplify the pressure of the fluid to recharge the accumulators without having to use energy from the free-piston engine. It would also be beneficial in systems having other sources of pressurized fluid to supplement the pressure in order to keep the main source from being used any more than necessary.

The present invention is directed to overcoming one or more of the problems as set forth above.

DISCLOSURE OF THE INVENTION

In one aspect of the present invention, an energy conversion system is provided and adapted to convert energy from a source of pressurized fluid to a fluid system. The fluid system includes a reservoir, an actuator arrangement, a directional control valve mechanism operatively connected to the source of pressurized fluid and the reservoir, and a control arrangement operative to receive an input command and direct command signals representative of the input command to the directional control valve mechanism to controllably direct pressurized fluid from the source of pressurized fluid to the actuator arrangement. The energy conversion system includes a pressure sensor that is connected to the source of pressurized fluid and operative to direct a signal to the control arrangement that is proportional to the level of the pressure being supplied by the source of pressurized fluid. A pressure select module arrangement is provided and has line pressure sensors operative to sense the operating pressure levels in the actuator arrangement and direct the sensed pressure level to the control arrangement. The pressure select module arrangement also includes first and second solenoid operated valves disposed in parallel between the directional control valve mechanism and the source of pressurized fluid. The energy conversion system also includes a power modifying unit that has first and second fluid transferring devices that are drivingly interconnected. The power modifying unit is disposed between the second solenoid operated valve of the pressure select module arrangement, the source of pressurized fluid and the reservoir. The control arrangement is operative to controllably direct pressurized fluid through the first solenoid operated valve to the actuator arrangement at a first pressure level and through the power modifying unit and the second solenoid operated valve at a second, lower pressure level.

BEST MODE FOR CARRYING OUT THE INVENTION

Figure 1:
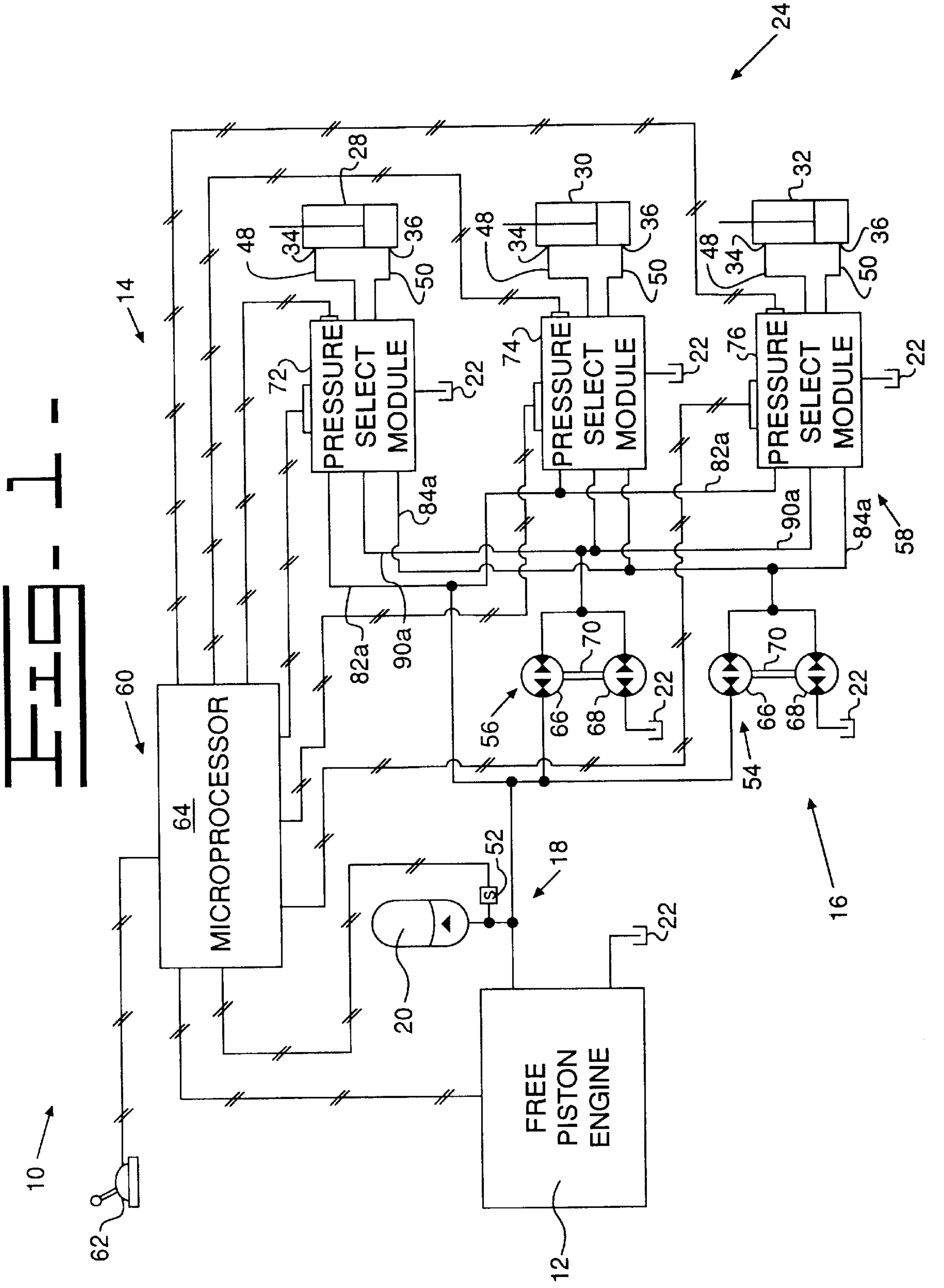
FIG. 1 is a schematic representation incorporating an embodiment of the present invention.
Figure 2:
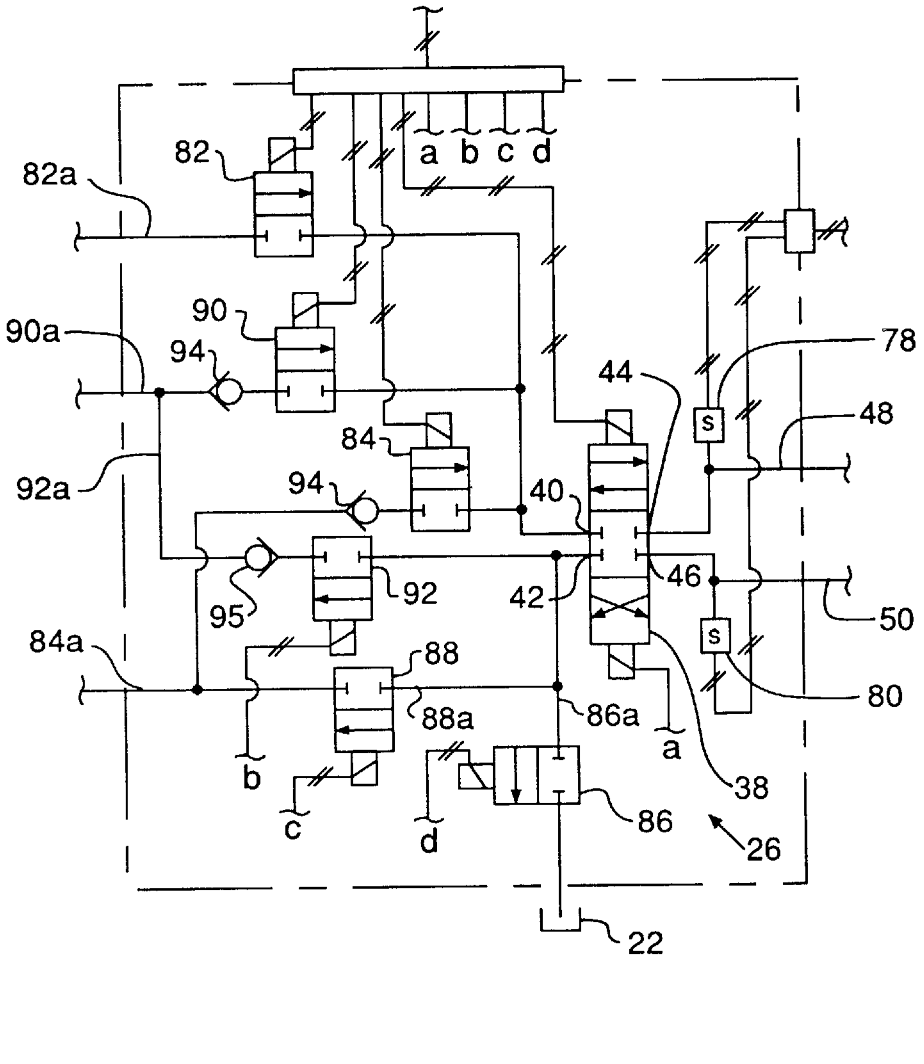
FIG. 2 is a more detailed schematic representation of a portion of FIG. 1.

Referring to the drawings, a work system 10 is illustrated and includes a source of pressurized fluid in the form of a thermo/hydraulic free-piston engine 12, a fluid system 14, and an energy conversion system 16. The fluid system 14 includes a pressure storage arrangement 18 in the form of an accumulator 20, a reservoir 22, an actuator arrangement 24, and a directional control valve mechanism 26. The accumulator storage arrangement 18 works in conjunction with the thermo/hydraulic free-piston engine to form the source of pressurized fluid. The actuator arrangement 24 includes respective actuators 28,30,32 and each actuator has first and second fluid ports 34,36. The directional control valve mechanism 26 includes respective directional control valves 38 for each of the actuators 28,30,32. Each of the directional control valves 38 has a pressure inlet port 40, an exhaust port 42 and work ports 44,46 connected to the respective first and second fluid ports 34,36 of the respective actuators 28,30,32 by conduits 48,50.

The energy conversion system 16 includes a pressure sensor 52 connected to the pressure storage arrangement 18, first and second power modifying units 54,56, a pressure select module arrangement 58 and a control arrangement 60 having an input controller 62 and a microprocessor 64 operative to deliver command signals in response to receipt of commands from the input controller 60.

The pressure sensor 52 is operative to direct a signal to the microprocessor 64 that is representative of the pressure level in the pressure storage arrangement 18. The control arrangement 18 is operative to stop the free-piston engine once the pressure in the pressure storage arrangement 18 reaches a predetermined maximum pressure level and to start the free-piston engine once the pressure level in the pressure storage arrangement 18 reduces to a predetermined minimum pressure level.

Each of the first and second power modifying units 54,56 has respective first and second fluid transferring devices 66,68 drivingly interconnected by a shaft 70. Each of the first and second fluid transferring devices 66,68 are in the form of a pump/motor. The displacement of the respective first and second fluid transferring devices 66,68 relative to each other determines the output flow and pressure relative to the flow and pressure being directed thereto. For example, if the displacement of each of the fluid transferring devices 66,68 is the same, the pressure level out to the actuator arrangement 24 is approximately one half the pressure level in the pressure storage arrangement 18. If the displacement of the first fluid transferring device 66 is larger than the displacement of the second fluid transferring device 68, the pressure level out to the actuator arrangement 24 is more than one half of the pressure level in the pressure storage arrangement 18. Likewise, if the displacement of the first fluid transferring device 66 is smaller the displacement of the second fluid transferring device 68, the pressure level out to the actuator arrangement 24 is less than one half of the pressure level in the pressure storage arrangement 18. This relationship is based on the formula of the pressure out is equal to the product of the pressure in the pressure storage arrangement 18 times the result of the displacement of the first fluid transferring device 66 being divided by the sum of the displacements of the first and second fluid transferring devices 66,68. The fluid being directed from the pressure storage arrangement 18 across the first fluid transferring device 66 causes it to act as a motor to efficiently decrease the pressure level of the fluid flowing thereacross. Since the first fluid transferring device 66 is connected to the second fluid transferring device 68 by the shaft 70, the second fluid transferring device 68 acts as a pump to increase the combined flow to the actuator arrangement 24 by drawing fluid from the reservoir 22.

The magnitude of the increase in volumetric flow is likewise dependent on the relationship between the displacement of the respective first and second fluid transferring devices 66,68. If the displacements of the fluid transferring devices 66,68 are the same, the volumetric flow is doubled and if the displacement of the second fluid transferring device 68 is smaller than the displacement of the first fluid transferring device 66, the volumetric flow is increased to a level less than doubled. This relationship is based on the formula of the flow out is equal to product of the flow from the pressure storage arrangement 18 times the result of the calculation of one plus the result of the displacement of the second fluid transferring device 68 divided by the displacement of the first fluid transferring device 66.

The pressure select module arrangement 58 includes first, second, and third pressure select modules 72,74,76. As illustrated, each of the pressure select modules 72,74,76 include the directional control valve 38. However, it is recognized that the directional control valve 38 could be separate from the respective pressure select modules. Since each of the pressure select modules 72,74,76 are the same, only one will be described in detail.

Each of the pressure select modules 72,74,76 includes first and second line pressure sensors 78,80 operative to direct a signal to the microprocessor 64 that is representative of the pressure in the respective first and second fluid ports 34,36 of the respective actuators 28,30,32.

A first solenoid operated valve 82 is disposed in the pressure select module 72 and connected between the pressure storage arrangement 18 and the pressure inlet port 40 of the directional valve 38 by a conduit 82*a*. The first solenoid operated valve 82 is movable between a flow blocking position and a flow passing position in response to receipt of a signal from the control arrangement 60. A second solenoid operated valve 84 is provided and connected by a conduit 84*a* between the first power modifying unit 54 and the pressure inlet port 40 of the directional control valve 38 and movable between a flow blocking position and a flow passing position in response to receipt of a signal from the control arrangement 60. A third solenoid operated valve 86 is provided and connected by a conduit 86*a* between the exhaust port 42 of the directional control valve 38 and the reservoir 22 and movable between a flow blocking position and a flow passing position in response to receipt of a signal from the control arrangement 60. A fourth solenoid operated valve 88 is connected by a conduit 88*a* between the exhaust port 42 of the directional control valve 38 and a point between the first power modifying unit 54 and the second solenoid operated valve 84 and movable between a flow blocking position and a flow passing position in response to receipt of a signal from the control arrangement 60. A fifth solenoid operated valve 90 is connected by a conduit 90*a* between the pressure inlet port 40 of the directional control valve 38 and the second power modifying unit 56 and movable between a flow blocking position and a flow passing position in response to receipt of a signal from the control arrangement 60. A sixth solenoid operated valve 92 is connected by a conduit 92*a* between the exhaust port 42 of the directional control valve 38 and a point between the second power modifying unit 56 and the fifth solenoid operated valve 90 and movable between a flow blocking position and a flow passing position in response to receipt of a signal from the control arrangement 60. The first, second and fifth solenoid operated valves are connected in parallel with the pressure inlet port 40 of the directional control valve 38.

In order to ensure that fluid does not flow from the pressure inlet port 40 of the directional control valve 38 to either of the respective first and second power modifying units 54,56 when either of the second or fifth solenoid valves 84,90 is in their flow passing positions, respective one way check valves 94 are positioned immediately upstream of the respective solenoid operated valves 84,90. Likewise, in order to ensure that pressurized fluid does not flow towards the exhaust port 42 of the directional control valve 38 when the sixth solenoid operated valve 92 is in the flow passing position, a one way check valve 95 is positioned in the conduit 92*a* immediately downstream of the sixth solenoid operated valve 92. It is recognized that the one way check valves 94,95 would not be needed if the opening and closing of the respective solenoid operated valves are synchronized.

It is recognized that the respective solenoid operated valves could be spring biased to one position and movable to the second position in response to the electrical signal without departing from the essence of the subject invention. It is also recognized that the source of pressurized fluid could be a variable displacement pump driven by an engine or could be a pump, either fixed or variable, driven by an electric motor. Furthermore, either one or both of the first and second fluid transferring devices 66,68 of the respective first and second power modifying units 54,56 could variable displacement devices. This would allow the flow and pressure relationships to be altered during use based on the system requirements as monitored by the microprocessor 46.

INDUSTRIAL APPLICABILITY

In the operation of the subject energy conversion system 16 as illustrated in the drawings, the free-piston engine 12 delivers a predetermined volume of pressurized fluid per stroke of the free-piston. The pressurized fluid is delivered to and stored in the pressure storage arrangement 18 (accumulator 20). Once the pressure in the accumulator 20 reaches the predetermined maximum pressure level as sensed by the pressure sensor 52, the microprocessor 64 acts to shut off the free-piston engine 12. During use, once the pressure in the accumulator 20 decreases to the predetermined minimum pressure level, the microprocessor 64 re-starts the free-piston engine 12 to again increase the pressure level in the accumulator 20.

In order to move one of the actuators, such as the actuator 28, an input command is made through the input controller 62. The input command is directed to the microprocessor 64 which in turn directs a control signal to move the directional control valve 38 to one of its operative positions. For example, the pressurized fluid is directed into the fluid port 36 of the actuator 28. Simultaneously, a signal is directed to the third solenoid operated valve 86 of the pressure select module 72 to open a path to the reservoir 22. Since the microprocessor 64 is continuously monitoring the pressure levels in each of the first and second fluid ports 34,36, the microprocessor 64 can easily determine the energy or pressure needed to move the actuator 28 against the load. If the energy or pressure needed is greater than the second or third pressure levels, the microprocessor 64 directs a signal to the first solenoid operated valve 82 to allow the highest level of pressurized fluid to flow thereacross to the pressure inlet port 40 of the directional control valve 38. If the pressure required is less than the third, intermediate pressure level but greater than the second, lower pressure level, the microprocessor 64 directs a signal to the fifth solenoid operated valve 90 to allow the intermediate level of pressurized fluid in the conduit 90*a* to pass therethrough. Likewise, if the pressure needed is less than the third, intermediate pressure level, the microprocessor 64 directs a signal to the second solenoid actuated valve 84 to allow the lower level of pressurized fluid in the conduit 84*a* to pass therethrough. By the microprocessor 64 continuously monitoring the requirements of the actuator arrangement 24, the actuator being used is always receiving fluid at only the pressure level needed to perform the task. Consequently, fluid from the source of pressurized fluid at higher pressure levels is not needed. Therefore, energy is being saved since the thermo/hydraulic free-piston engine, or whatever source of pressurized fluid is being used, does not have to continuously produce fluid at an elevated pressure level.

As previously noted the magnitude of the intermediate and lower pressure levels can be controlled/fixed by adjusting the relationship between the relative displacements of the first and second fluid transferring devices 66,68 of each of the first and second power modifying units 54,56. In the subject arrangement, the third, intermediate pressure level is approximately two-thirds of the highest pressure level and the second, lower pressure level is approximately one-third of the highest pressure level. It is recognized that additional pressure levels could be obtained by adding additional power modifying units.

In the event pressurized fluid is being directed through the first solenoid operated valve 82 to the directional valve 38 and to the first fluid port 34 of the actuator 28 and a load is being lowered, the fluid being exhausted from the actuator 28 through the exhaust port 42 of the directional valve 38 has potential energy stored therein due to the force of the load acting to force the fluid out at a high velocity. The energy of the fluid being exhausted from the actuator 28 is converted to useful energy in the subject invention. Since the microprocessor 64 is continually monitoring the level of pressure at the first and second fluid ports 34,36 of the actuator 28, the differential pressure therebetween is likewise monitored. If the differential pressure is relatively low, for example below about 3500 kPa (508 psi) and the pressure in the fluid port 36 is greater than the pressure in the fluid port 34, the microprocessor 64 simultaneously directs signals to the third solenoid operated valve 86 to block the flow to the reservoir 22, to the second and fourth solenoid operated valves 84,88 to permit flow therethrough to add to the flow being directed to the pressure inlet port 40. It is recognized that even if the differential pressure between the first and second fluid ports 34,36 is above the 3500 kPa level, the fluid from the actuator 28 can still be combined with the fluid being directed to the actuator 28. When the pressure differential is high a lot of the energy is lost or wasted due to the high pressure drop across the directional control valve 38.

When the pressure differential is greater than about 3500 kPa, the energy of the fluid from the actuator 28 can be more efficiently used to recharge the accumulator 20. Consequently, when the differential pressure is high, as sensed by the first and second line pressure sensors 78,80, the microprocessor 64 directs a signal to the third solenoid operated valve 86 to block fluid flow thereacross and simultaneously directs a signal to one of the fourth and sixth solenoid operated valves 88,92. The microprocessor 64 compares the level of the pressure in the accumulator 20 to the potential level of pressure that each of the first and second power modifying units 54,56 can produce with the fluid being exhausted from the actuator 28. If the potential pressure level capable of being produced by the second power modifying unit 56 is higher than the pressure level in the accumulator 20, the microprocessor 64 directs the signal to the sixth solenoid operated valve 92 to permit fluid to pass therethrough to the second power modifying unit 56.

The pressurized fluid in the conduit 90*a* acts on the second fluid transferring device 68 causing it to function as a fluid motor. Since the second fluid transferring device 68 is coupled to the first fluid transferring device 66 by the shaft 70, the first fluid transferring device 66 acts as a pump and increases the pressure level of the fluid passing thereacross to the accumulator 20. If the displacement of each of the fluid transferring devices 66,68 is the same, the pressure level of the fluid entering the first fluid transferring device 66 is increased approximately two fold. Likewise, if the displacement of the first fluid transferring device 66 is greater than the displacement of the second fluid transferring device, the pressure level is increased but less than two fold. If the displacement of the first fluid transferring device 66 is less than the displacement of the second fluid transferring device, the pressure level is increased more than two fold.

Each of the pressure select modules 72,74,76 function in the same manner, consequently, no additional operation is needed. It is recognized that more than one actuator 28,30,32 could be used at one time without departing from the essence of the invention.

In view of the foregoing, it is readily apparent that the energy conversion system of the subject invention is an efficient system since the microprocessor 64 continually monitors the requirements needed to move the load and chooses the path of pressurized fluid requiring the least level of pressure to accomplish the task. Additionally, when there is energy in the fluid being exhausted from the actuator 28, the microprocessor 64 of the system continually monitors the pressure differential at the actuator 28 and depending on the level of the differential pressure, the microprocessor 64 determines the most efficient manner to use the energy being exhausted. If the differential is low, the exhausted fluid is recombined with the fluid entering the actuator 28 and if the differential is high, the exhausted fluid is directed to the appropriate one of the power modifying units 54,56 which amplifies the pressure level and directs it to recharge the accumulator 20.

Other aspects, objects and advantages of the invention can be obtained from a study of the drawings, the disclosure and the appended claims.

I claim:

1. An energy conversion system adapted to convert energy from a source of pressurized fluid to a fluid system having, a reservoir, an actuator arrangement, a directional control valve mechanism operatively connected to the source of pressurized fluid and the reservoir, and a control arrangement operative to receive an input command and direct command signals representative of the input command to the directional control valve mechanism to controllably direct pressurized fluid from the source of pressurized fluid to the actuator arrangement, the energy conversion system comprises:

a pressure sensor connected to the source of pressurized fluid and operative to direct a signal to the control arrangement that is proportional to the level of the pressure being produced by the source of pressurized fluid;

a pressure select module arrangement having line pressure sensors operative to sense the operating pressure level in the actuator arrangement and direct the sensed pressure level to the control arrangement and first and second solenoid operated valves disposed in parallel between the directional control valve mechanism and the source of pressurized fluid;

a power modifying unit having first and second fluid transferring devices and disposed between the second solenoid operated valve of the pressure select module arrangement, the source of pressurized fluid and the reservoir, the first and second fluid transferring devices being drivingly interconnected; and the control arrangement being operative to controllably direct pressurized fluid through the first solenoid operated valve to the actuator arrangement at a first pressure level and through the power modifying unit and the second solenoid operated valve at a second, lower pressure level.

2. The energy conversion system of claim 1 wherein the control arrangement is operative to control the pressure level from the source of pressurized fluid between a predetermined maximum pressure level and a predetermined minimum pressure level.

3. The energy conversion system of claim 2 wherein the actuator arrangement includes an actuator having first and second fluid ports, the directional control valve mechanism includes a direction control valve having a pressure inlet port and an exhaust port and being connected to the respective fluid ports of the actuator, the flow from the exhaust port being connected to the reservoir, and the pressure select module arrangement includes a pressure select module having the first and second solenoid operated valves, a third solenoid operated valve disposed between the directional control valve and the reservoir and operative in response to receipt of a signal from the control arrangement to block fluid flow therethrough and a fourth solenoid operated valve disposed between a point upstream of the third solenoid operated valve and a point between the second solenoid operated valve and the fluid modifying unit and is operative in response to receipt of a signal from the control arrangement to permit fluid flow therethrough.

4. The energy conversion system of claim 3 wherein the line pressure sensors includes first and second line pressure sensors connected to the respective first and second fluid ports of the actuator, and when the pressure of the fluid from the actuator is greater than the second, lower pressure level upstream of the second solenoid operated valve the control arrangement delivers a signal to the third solenoid operated valve to block fluid flow thereacross and substantially simultaneously directs a signal to the fourth solenoid operated valve to permit fluid flow thereacross from the exhaust port of the directional valve to the point of connection between the second solenoid operated valve and the power modifying unit.

5. The energy conversion system of claim 4 wherein when the pressure of the fluid from the actuator is less than the pressure level of the first predetermined maximum pressure level in the pressure storage arrangement, the fluid flow from the exhaust port is directed to the power modifying unit and a portion of the fluid is directed across one of the first and second fluid transferring devices to the reservoir and another portion is directed across the other fluid transferring device to the source of pressurized fluid at an amplified pressure level.

6. The energy conversion system of claim 4 wherein when the pressure of the fluid to the actuator is less than the pressure of the fluid from the actuator, the control arrangement directs a signal to the second solenoid operated valve to open fluid communication thereacross to the directional control valve.

7. The energy conversion system of claim 5 including a second power modifying unit having first and second drivingly interconnected fluid transferring devices and the pressure select module includes a fifth solenoid operated valve connected to the pressure inlet port of the directional control in parallel with the first and second solenoid operated valves, the second power modifying unit being disposed between the fifth solenoid operated valve, the source of pressurized fluid and the reservoir, and the control arrangement being operative to controllably direct pressurized fluid through the second power modifying unit and the fifth solenoid operated valve to the directional control valve at a third, intermediate pressure level.

8. The energy conversion system of claim 7 wherein the pressure select module includes a sixth solenoid operated valve disposed between the exhaust port of the directional control valve and a point between the second power modifying unit and the fifth solenoid operated valve.

9. The energy conversion system of claim 8 wherein when the pressure of the fluid at the exhaust port of the directional control valve is greater than the pressure level of the fluid between the second power modifying unit and the fifth solenoid operated valve, the control arrangement directs a signal to the third solenoid operated valve to block fluid flow thereacross and substantially simultaneously directs a signal to the sixth solenoid operated valve to permit fluid flow thereacross from the exhaust port of the directional control valve to the point of connection between the fifth solenoid operated valve and the second power modifying unit.

10. The energy conversion system of claim 9 wherein when the pressure of the fluid from the actuator is less than the pressure level of the first predetermined maximum pressure level in the source of pressurized fluid but greater than the second, lower pressure level, the fluid flow is directed to the second power modifying unit and a portion of the fluid is directed across one of the first and second fluid transferring devices to the reservoir and another portion is directed across the other fluid transferring device to the source of pressurized fluid at an amplified pressure level.

11. The energy conversion system of claim 10 wherein when the pressure of the fluid from the actuator is greater than the pressure of the fluid to the actuator and greater than the second, lower pressure level but less than the third intermediate pressure level, the control arrangement directs a signal to the fifth solenoid operated valve to open fluid communication thereacross to the directional control valve.

12. The energy conversion system of claim 11 wherein the actuator arrangement includes a second actuator having first and second fluid ports, the directional control valve mechanism includes a second directional control valve having an inlet port and an exhaust port, and the pressure select module arrangement includes a second pressure select module having first, second, third and fourth solenoid operated valves, and the flow through the fourth solenoid operated valve of the second pressure select module is also directed to the first power modifying unit.

13. The energy conversion system of claim 12 wherein the flow through the sixth solenoid operated valve of the second pressure select module is directed to the second power modifying unit.

14. The energy conversion system of claim 13 wherein the source of pressurized fluid includes a thermo/hydraulic free-piston engine connected to a pressure storage arrangement.

15. The energy conversion system of claim 14 wherein the control arrangement is operative to turn-off the hydraulic free-piston to the in response to the pressure in the pressure storage arrangement reaching the predetermined maximum pressure level and starting the hydraulic free-piston engine when the pressure in the pressure storage arrangement reaches the predetermined minimum pressure level.

16. The energy conversion system of claim 11 wherein control arrangement monitors the differential pressure between the respective first and second ports of the actuator and when the differential is larger than about 3500 kPa, the control arrangement directs the fluid flow from the actuator to the appropriate power modifying unit and when the differential is smaller than about 3500 kPa, the control arrangement directs the fluid flow back to the inlet port of the actuator through the directional control valve.

17. An energy conversion system adapted to convert energy from a hydraulic free piston engine to a fluid system having, a reservoir, an actuator arrangement, a directional control valve mechanism operatively connected to the hydraulic free piston engine and the reservoir, and a control arrangement operative to receive an input command and direct command signals representative of the input command to the directional control valve mechanism to controllably direct pressurized fluid from the hydraulic free piston engine to the actuator arrangement, the energy conversion system comprises:

a pressure sensor connected to the hydraulic free piston engine and operative to direct a signal to the control arrangement that is proportional to the level of the pressure being produced by the hydraulic free piston engine;

a pressure select module arrangement having line pressure sensors operative to sense the operating pressure level in the actuator arrangement and direct the sensed pressure level to the control arrangement and a first solenoid operated valve disposed between the directional control valve mechanism and the free piston engine, and a second solenoid operated valve disposed between the directional control valve and the reservoir; and a power modifying unit disposed between the first solenoid operated valve of the pressure select module arrangement and the free piston engine and the reservoir and operative to controllably adjust the pressure and volume of fluid between the free piston engine and the actuator arrangement.

18. The energy conversion system of claim 17 wherein the control arrangement is operative to controllably block the flow of pressurized fluid from the power modifying unit to one end of the actuator arrangement and to force the flow of fluid from the other end of the actuator arrangement to flow back through the power modifying unit towards the free piston engine.

19. The energy conversion system of claim 18 wherein the power modifying unit has first and second fluid transferring devices that are drivingly interconnected.

* * * * *

UNITED STATES PATENT AND TRADEMARK OFFICE
CERTIFICATE OF CORRECTION

PATENT NO. : 5,878,569

DATED : March 9, 1999

INVENTOR(S) : Ronald L. Satzler

It is certified that error appears in the above-identified patent and that said Letters Patent is hereby corrected as shown below:

Column 9, line 24, delete "to the" (first occurrence) and insert --engine--.

Signed and Sealed this

Tenth Day of August, 1999

Attest:

Q. TODD DICKINSON

*Attesting Officer*

*Acting Commissioner of Patents and Trademarks*